United States Patent
Hirosawa et al.

[11] 3,903,726
[45] Sept. 9, 1975

[54] GAS DETECTING DEVICE

[75] Inventors: Yoshiaki Hirosawa, Tokorozawa; Tsuneo Takahashi, Fukuoka, both of Japan

[73] Assignee: Honda Giken Kogyo Kabushiki Kaisha, Tokyo, Japan

[22] Filed: May 14, 1973

[21] Appl. No.: 360,172

[30] Foreign Application Priority Data
June 13, 1972  Japan................................. 47-68898
June 13, 1972  Japan................................. 47-68899

[52] U.S. Cl. .................................................. 73/23
[51] Int. Cl.² ........................................... G01N 31/00
[58] Field of Search ......... 73/23, 421.5 R, 27 R, 27; 23/232 R, 232 E, 254 R, 254 E

[56] References Cited
UNITED STATES PATENTS

| | | |
|---|---|---|
| 3,166,938 | 1/1965 | Weyrauch et al. ................. 73/23 X |
| 3,242,717 | 3/1966 | Matle et al. ...................... 73/27 R |
| 3,338,087 | 8/1967 | Moberg et al. ......................... 73/23 |
| 3,427,862 | 2/1969 | Hubner ................................. 73/23 |
| 3,437,449 | 4/1969 | Luckey ............................ 23/254 R |
| 3,482,233 | 12/1969 | Ogg .............................. 73/27 R X |
| 3,676,820 | 7/1972 | Taguchi ........................... 73/27 X |

Primary Examiner—Richard C. Queisser
Assistant Examiner—Stephen A. Kreitman
Attorney, Agent, or Firm—Haseltine, Lake & Waters

[57] ABSTRACT

A gas detecting device, particularly for detecting alcohol fumes, including a tubular body having a gas inlet aperture and a battery-actuated suction fan for aspirating the gas over a gas-sensitive semiconductor element, and indicator lamp means for emitting a signal in response to the semiconductor element sensing the presence of alcoholic fumes.

1 Claim, 2 Drawing Figures

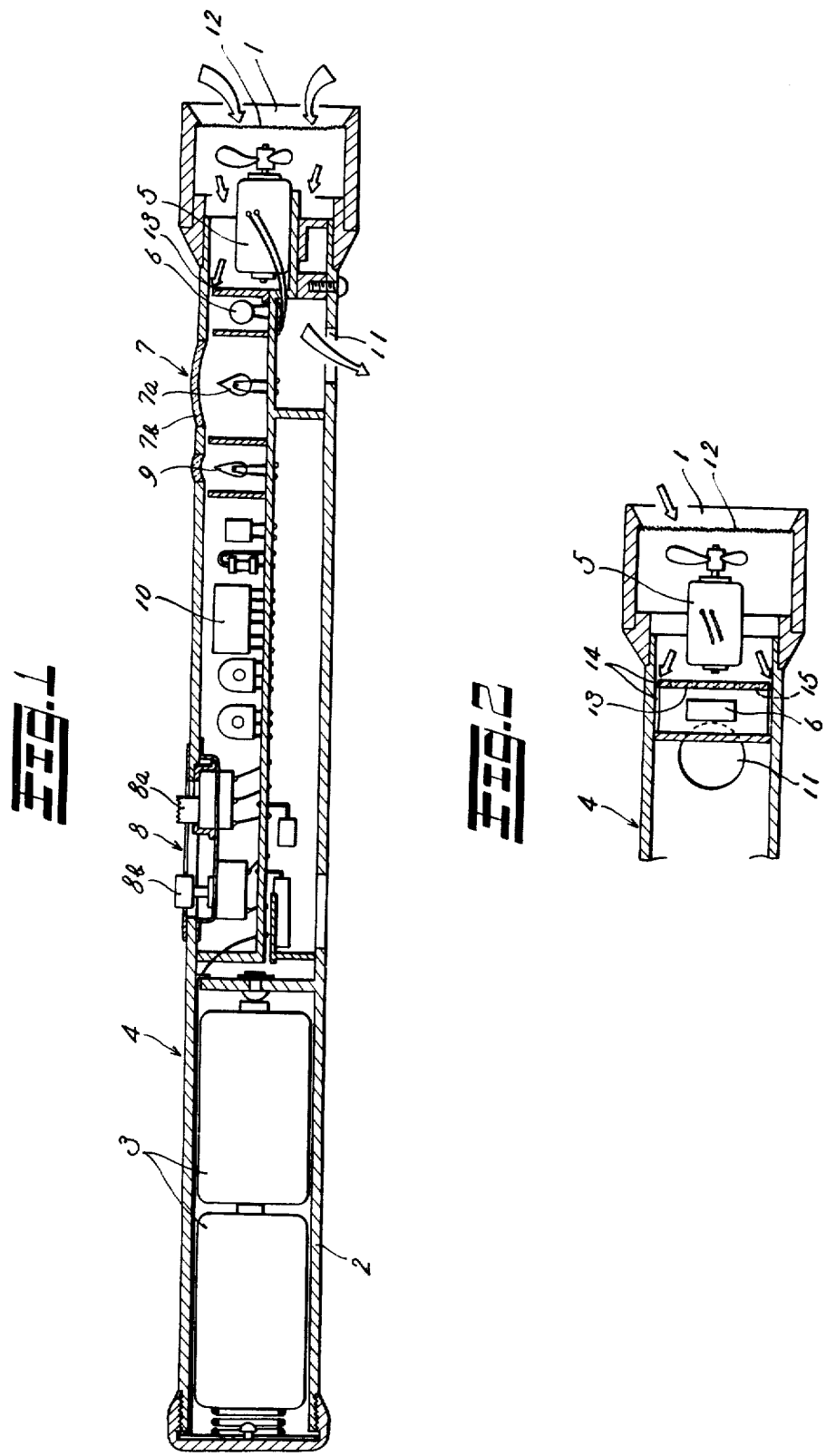

3,903,726

GAS DETECTING DEVICE

FIELD OF THE INVENTION

The present invention relates to gas detecting devices and, more particularly, to a portable device for detecting alcohol fumes enabling a police officer to ascertain the state of inebriation of a motor vehicle operator.

Frequently, for purposes of public safety and protection, it becomes necessary for a police officer to examine the operator of a motor vehicle whoe evinces some degree of intoxication tending to make his operation of the motor vehicle dangerous to him and to others.

DISCUSSION OF THE PRIOR ART

Although devices are presently known for ascertaining the intoxication of motor vehicle drivers or operators, by testing the composition of their breath, blood chemistry, or physical and mental reflexes, these are usually quite complex and cumbersome. Consequently, intoxication tests are generally conducted in police stations or at various locations remote from the scene of apprehension of the operator. This will often enable the operator to sober up and prevent the reliable measurement and determination of any alcoholic fumes which may be present in the operators' breath.

SUMMARY OF THE INVENTION

Accordingly, it is an object of the present invention to provide a compact and portable gas detecting device.

It is another object of the present invention to provide a gas detecting device of the type described which affords the highly accurate and rapid determination of alcoholic fumes which may be present in the breath of the operator of a motor vehicle.

A more specific object of the present invention is to provide a gas detecting device for ascertaining any alcoholic fumes in the breath of a motor vehicle operator, which may be readily carried and manipulated by a police officer or any one administering the breath-analyzing test.

BRIEF DESCRIPTION OF THE DRAWING

These and other objects of the invention may be more readily ascertained by referring to an exemplary embodiment of the gas detecting device, taken in conjunction with the accompanying drawing, in which:

FIG. 1 is a longitudinal sectional view of a gas detecting device according to the invention; and FIG. 2 is a fragmentary sectional plan view of one end of the device of FIG. 1.

DETAILED DESCRIPTION

The device for detecting a gas, such as for example, alcohol fumes may be employed for a case in which a police officer carries it with him in order to ascertain whether a motorcar driver is inebriated, by testing the latters breath. The device includes a tubular body 4 having at a front end thereof a gas inlet opening 1, and is formed at its rear half portion to constitute a grip portion 2. The portion 2 contains therein a battery 3 operatively connected for actuation of a suction fan 5 located in the front end portion. The fan 5 aspirates the breath of the driver through opening 1, and towards a gas-sensitive semiconductor element 6 positioned in the tube 4 downstream of the gas inlet opening 1. Located downstream of the element 6, and on formed the side wall surface of the tubular body 4, is a detection indicating portion 7, and a device operating switch 8.

The detection indicating portion 7 includes an interior indicator lamp 7a which is adapted to be illuminated when the semiconductor element 6 senses gas, such as alcoholic fumes, in the breath of the driver, and also includes an upper indication window 7b formed in the tube wall, positioned downstream of the semiconductor element 6. An electric source pilot lamp 9 is located downstream of the lamp 7a, and a suitable condenser, a resistor and other components collectively constituting a control circuit 10 for the semiconductor element 6 are positioned downstream of the pilot lamp 9.

The device operating switch 8 comprises a slidable switch 8a formed in the front surface side wall of tube 4, and a rear side push-button switch 8b, so as to operatively provide that the slidable switch 8a is first closed for condition the semiconductor element 6 in readiness for its operating sequence, and then the switch 8b is closed for actuation of the suction fan 5. An air exhaust opening 11 is formed in the side of tube 4, while a wire screen provides a protective cover for the inlet opening 1.

Thus, according to the invention, the entire device is externally formed of the tubular body 4 having its rear-half portion constructed as the grip portion 2, whereby the device can be readily carried and easily manipulated. Additionally, the tubular body 4 has located the gas inlet opening 1 at its front end, and is provided immediately downstream of the inlet opening 1 with the suction fan 5 and the gas sensitive semiconductor element 6, so that a highly sensitive degree of gas detection for any desired gas content in the breath may be effected, and the detected results easily determined from the tube side wall surface detection indicating portion 7.

Since this type of semiconductor element is usually operated under comparatively high temperature conditions due to being subjected to internal electric current flow in the device, so that if a ventilation flow acts directly thereon the temperature thereof is lowered by the ventilating air cooling action, and its sensitively is, accordingly, largely lowered.

Consequently, a feature of the invention lies in removing this drawback, by positioning, in the aforedescribed arrangement, a ventilation obstructing barrier or plate 13 between the suction fan 5 and the gas sensitive semiconductor element 6. The obstructing plate 13 is so arranged that an air space 14 extends between the outer periphery thereof and the inner surface of the side wall of the tubular body 4, or small through holes 15 are made therein, as shown in the dotted lines in FIG. 2, so that a comparatively gentle and smooth ventilation flow is allowed to pass therethrough.

Thus, according to the above-described feature of the invention, the device is constructed that, when the gas to be detected is introduced by the suction fan 5 into contact with the downstream positioned semiconductor element 6, the ventilation obstructing plate 13 is located therebetween, whereby the ventilation flow does not act directly on the semiconductor element 6, which would result in a temperature drop and consequential sensitivity reduction.

While there has been shown what is considered to be the preferred embodiment of the invention, it will be obvious that modifications may be made which come within the scope of the disclosure of the specification.

What is claimed is:

1. A portable and manually-operated gas detecting device comprising a generally tubular body having the rear portion thereof adapted to form a hand gripping surface; gas inlet aperture means formed at a front end of said tubular body; battery means being positioned in said tubular body proximate the other end thereof; a partition wall extending through a portion of said tubular body; suction fan means in said tubular body supported on said partition wall being located downstream of said inlet aperture means and adapted to be operatively connected to said battery means; gas-sensitive semi-conductor means in said tubular body supported on said partition wall being positioned downstream of said suction fan means so as to receive a stream of gas aspirated by the latter through said inlet aperture means; gas detection indicating means on said tubular body including a viewing window formed in the side wall of the latter communicating with said semiconductor means; operating switch means interconnecting said suction fan means, replaceable battery means and semiconductor means for actuating said device in gas-detecting relationship; indicator lamp means supported on said partition wall in said tubular body in alignment with said window and adapted to be illuminated upon detection of the presence of a gas in said device; and plate-like barrier means being interposed between said suction fan means and said semiconductor means for deviating the flow of ventilating air, said semiconductor means being adapted to detect the presence of alcoholic fumes in said tubular body.

* * * * *